(12) United States Patent
Ford

(10) Patent No.: US 7,035,808 B1
(45) Date of Patent: Apr. 25, 2006

(54) ARRANGEMENT FOR RESOURCE AND WORK-ITEM SELECTION

(75) Inventor: Jon Allan Ford, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/420,912

(22) Filed: Oct. 20, 1999

(51) Int. Cl.
G06F 17/60 (2006.01)

(52) U.S. Cl. .................................... 705/7
(58) Field of Classification Search ............ 705/7, 705/8–9
See application file for complete search history.

(56) References Cited

U.S. PATENT DOCUMENTS

| | | | | |
|---|---|---|---|---|
| 5,206,903 A * | 4/1993 | Kohler et al. | ......... | 379/265.12 |
| 5,335,269 A | 8/1994 | Steinlicht | ............... | 379/266 |
| 5,506,898 A | 4/1996 | Costantini et al. | ......... | 379/266 |
| 5,826,236 A * | 10/1998 | Narimatsu et al. | ......... | 700/100 |
| 5,903,641 A * | 5/1999 | Tonisson | ............... | 379/265.12 |
| 5,918,207 A * | 6/1999 | McGovern et al. | ............ | 705/1 |
| 5,963,911 A * | 10/1999 | Walker et al. | ............. | 700/100 |
| 5,974,392 A | 10/1999 | Endo | | |
| 6,044,355 A * | 3/2000 | Crockett et al. | ....... | 379/265.05 |
| 6,070,142 A * | 5/2000 | McDonough et al. | ......... | 705/7 |
| 6,130,942 A | 10/2000 | Stenlund | ............... | 379/265 |
| 6,163,607 A * | 12/2000 | Bogart et al. | ......... | 379/266.01 |
| 6,249,715 B1 | 6/2001 | Yuri et al. | | |
| 6,275,812 B1 * | 8/2001 | Haq et al. | ................. | 705/11 |
| 6,347,303 B1 | 2/2002 | Nagai et al. | | |
| 6,389,400 B1 * | 5/2002 | Bushey et al. | ................ | 705/7 |

FOREIGN PATENT DOCUMENTS

| | | | |
|---|---|---|---|
| EP | 0 740 450 A2 | | 10/1996 |
| JP | 08137811 A | * | 5/1996 |
| JP | 8-287162 | | 11/1996 |
| JP | 10-261122 | | 9/1998 |
| JP | 11-110204 | | 4/1999 |

OTHER PUBLICATIONS

Business Editors et al., Lucent Technologies Unveils Breakthrough Call Center Software That Improves Customer Care, Increases Sales and Reduces Costs, Business Wire, Feb. 4, 1998 [PROQUEST].*

(Continued)

Primary Examiner—Tariq R. Hafiz
Assistant Examiner—Michael C. Heck
(74) Attorney, Agent, or Firm—David Volejnicek

(57) ABSTRACT

A workflow system (FIG. 1) employs a selection engine (114) that attempts to match work items (100) with resources (104) in such a way that it brings the most value to all of the stakeholders in the workflow. Under resource or work-item surplus conditions (FIG. 4 or 5), the selection engine determines either those available resources that possess skills needed by an available work item or those available work items that need skills possessed by an available resource, for each determined resource determines both a business value (RSBV) of having that resource service the work item and either a value (RTV) to that resource of servicing the work item or a value (WTV) to that work item of being serviced by the resource, and then selects the resource that has a best combined value of the business value and the value to the resource or work item.

55 Claims, 5 Drawing Sheets

| WORK ITEM n CLASSIFICATIONS | | | | | | |
|---|---|---|---|---|---|---|
| 302 — SKILLS ($m$) | $m=1$ | $m=2$ | . . . . . . . . . . . | $m=M$ | | |
| 304 — SKILL REQUIREMENTS (BRR) | T/F | T/F | . . . . . . . . . . . | T/F | | |
| 306 — SKILL WEIGHTS (BR) | 0 – N | 0 – N | . . . . . . . . . . . | 0 – N | | |
| 308 — RESOURCE FAIRNESS (T) WEIGHTS (TW) | TOTAL IDLE TIME (1) $TW_1$ | | PERCENT NON-OCCUPIED TIME (2) $TW_2$ | | SERVICE OBJECTIVE (3) $TW_3$ | |
| 312 — WORK ITEM FAIRNESS (C) WEIGHTS (CW) | PRESENT WAIT TIME (1) $CW_1$ | | ESTIMATED WAIT TIME (2) $CW_2$ | | TIME EXCEEDING TARGET WAIT TIME (3) $CW_3$ | |
| 314 — RESOURCE SURPLUS (RS) WEIGHTS (W) | BUSINESS VALUE (BV) $W_{RSBV}$ | | | RESOURCE FAIRNESS (T) $W_{AT}$ | | |
| 316 — WORK ITEM SURPLUS (WS) WEIGHTS (W) | BUSINESS VALUE (BV) $W_{WSBV}$ | | | WORK ITEM FAIRNESS (C) $W_{CV}$ | | |
| 318 — TARGET WAIT TIME (TARGET) | | | | | | |

300

OTHER PUBLICATIONS

"*Centre Vu®* Advocate User Guide," Lucent Technologies, Bell Labs Innovations.

"DEFINITY®, Enterprise Communications Server Release 6, Call Vectoring/Expert Agent Selection (EAS) Guide," Lucent Technologies, Bell Labs Innovations.

Hassler, K.W. et al., *Revolutionizing Definity Call Centers In the 1990s*, AT&T Technical Journal, U.S., American Telephone and Telegraph Co., New York, vol. 74, No. 4, Jul. 1, 1995, pp. 64-73.

* cited by examiner

| | RESOURCE n QUALIFICATIONS | | | | | | | | |
|---|---|---|---|---|---|---|---|---|---|
| SKILLS ($\underline{m}$) | $m=1$ | $m=5$ | . . . . . . . . . | $m=K$ | | | | | |
| SKILL LEVELS (A) | 0–N | 0–N | . . . . . . . . . | 0–N | | | | | |
| SKILL ALLOCATION GOALS (G) | % | % | . . . . . . . . . | % | | | | | |
| TOTAL SKILL TIMES (TT) | | | . . . . . . . . . | | | | | | |
| WORK TIME | LOGGED-IN TIME | IN-CALL TIME | ACW TIME | BUSY TIME | READY TIME | TOTAL PROCESSING TIME ($T_P$) | | | |
| STATE | PRESENT STATE | | | TIME OF LAST STATE CHANGE | | | | | |

| | WORK ITEM n CLASSIFICATIONS | | | | | | | | | |
|---|---|---|---|---|---|---|---|---|---|---|
| 302 — SKILLS (m) | m=1 | m=2 | . | . | . | . | . | . | . | m=M |
| 304 — SKILL REQUIREMENTS (BRR) | T/F | T/F | . | . | . | . | . | . | . | T/F |
| 306 — SKILL WEIGHTS (BR) | 0–N | 0–N | . | . | . | . | . | . | . | 0–N |
| 308 — RESOURCE FAIRNESS (T) WEIGHTS (TW) | TOTAL IDLE TIME (1) TW$_1$ | | PERCENT NON-OCCUPIED TIME (2) TW$_2$ | | | | SERVICE OBJECTIVE (3) TW$_3$ | | | |
| 312 — WORK ITEM FAIRNESS (C) WEIGHTS (CW) | PRESENT WAIT TIME (1) CW$_1$ | | ESTIMATED WAIT TIME (2) CW$_2$ | | | | TIME EXCEEDING TARGET WAIT TIME (3) CW$_3$ | | | |
| 314 — RESOURCE SURPLUS (RS) WEIGHTS (W) | BUSINESS VALUE (BV) W$_{RSBV}$ | | | | | | RESOURCE FAIRNESS (T) W$_{AT}$ | | | |
| 316 — WORK ITEM SURPLUS (WS) WEIGHTS (W) | BUSINESS VALUE (BV) W$_{WSBV}$ | | | | | | WORK ITEM FAIRNESS (C) W$_{CV}$ | | | |
| 318 — TARGET WAIT TIME (TARGET) | | | | | | | | | | |

*FIG. 3*

ARRANGEMENT FOR RESOURCE AND WORK-ITEM SELECTION

TECHNICAL FIELD

This invention relates to workflow management.

BACKGROUND OF THE INVENTION

In a workflow, work items—be they physical items like products and paper documents or virtual items like communications and electronic documents—progress through one or more steps of processing each performed by resources, e.g., workmen, machines, agents, that are allocated in whole or in part to those stages. Representative workflows include call centers and assembly lines.

Traditional call-center resource and work-item selection algorithms have been limited by the call-center model presented by the automatic call distribution (ACD) switch. These conventional workflows generally employ a first-in, first-out (FIFO) selection algorithm at each state: the first available resource handles the first available work item. While variations on this basic algorithm have been developed over time, the underlying algorithm remains the same. For example, one known ACD switch represents resources as having skills and skill levels, and provides multi-priority queues for queuing work items to wait for resources with corresponding skills to become available. So any algorithms that are applied to this model are constrained by its limited and fixed structure. This conventional approach handles simple deviations from the underlying FIFO selection principle. But it quickly becomes unwieldy when used to implement a complex or flexible selection algorithm such as may be needed to select a "best" work item for the "best" resource. The limitations of this conventional approach become evident when one considers the example of an insurance company that sells three types of insurance, each one of whose agents must be licensed to sell each of these types of insurance on a state-by-state basis, and whose call center allows callers to select English-speaking or Spanish-speaking agents. This results in 300 possible combinations of skill requirements. Administering the conventional ACD switch for all of these combinations would be difficult if not impossible.

SUMMARY OF THE INVENTION

This invention is directed to solving these and other problems and disadvantages of the prior art. Generally according to the invention, there is provided a new workflow resource-selection and work-item-selection arrangement that attempts to match work items with resources in such a way that it brings the most value to all of the stakeholders in the workflow. This may include customers, resources, managers, etc. The arrangement defines resources as having particular skills and preferably also levels of proficiency in those skills, as is conventional. It classifies work items when they arrive for processing as requiring certain skills, as is also conventional. Under resource surplus conditions, the arrangement determines those available resources that possess skills needed by an available work item, for each determined resource determines both a business value of having that resource service the work item and a value to that resource of servicing the work item, and then selects the resource that has a best combined value of the business value and the value to the resource to serve the work item. Under work-item surplus conditions, the arrangement determines those available work items that need skills possessed by an available resource, for each determined work item determines both a business value of having that work item serviced by the resource and a value to that work item of being serviced by the resource, and then selects the work item that has a best combined value of the business value and the value to the work item to be served by the resource. The arrangement may thus be viewed as setting goals for work-item processing and resource treatment and then matching work items to resources in a way that optimizes the workflow to bring the most value to all of the stakeholders in the workflow. Illustratively, the arrangement indicates a weight for each skill needed by a work item, and the business value is computed as a sum of products of a proficiency level of the resource in each of the skills and the weight of that skill of the work item. Further illustratively, the arrangement keeps track of treatments that are being given to resources and work items, e.g., for resources, a time since the resource became available, a time that the resource has not spent serving work items, and a measure of an effect that serving a work item would have on a goal of the resource; and for work items, a time that the work item has been waiting for service, an estimated time that the work item will have to wait for service, and a time by which the work item has exceeded its target wait time. The values to the resource and to the work, item are then computed from these treatments. Illustratively, the arrangement indicates a weight to be given to each of the treatments, whereupon the value to a resource is computed as a sum of products of each treatment of the resource and the weight of the treatment, and the value to a work item is computed as a sum of products of each treatment of the work item and the weight of that treatment.

Preferably, all of the computed values are scaled, i.e., normalized, to ensure that the degree of their effect on the final combined value stays within predetermined bounds. Therefore, determining a business value preferably involves determining a weighted business value, which is the business value weighted by a business value weight that is preferably common to all available or determined resources under resource surplus conditions and to all or available or determined work items under work-item surplus conditions. Also, determining a value to the resource preferably involves determining a weighted value to the resource, which is the value to the resource weighted by a resource value weight that is preferably common to all available or determined resources, and determining a value to the work item preferably involves determining a weighted value to the work item, which is the value to the work item weighted by a work item value weight that is preferably common to all available or determined work items. Selecting a resource or a work item then involves selecting the resource or work item that has the best combined value (e.g., sum) of the weighted business value and the weighted value to the resource or work item.

Depending on implementation, the invention offers one or more of the following advantages.
- Allows for substantially an unlimited number of skills (limited by computing power only)
- Provides for an individual weighting of multiple skills that are required to process each work item
- Considers both required and non-required skills
- Considers and weights multiple skill levels across multiple skills
- Each work item can receive a different priority weight for business value, resource fairness, and work-item fairness Each work item can receive a different priority weight for different categories of resource fairness Each work item can receive a different priority weight for different categories of work-item fairness Allows for extensive customization of the process of matching resources with work items—even on a work-item-specific or a resource-specific basis.

An estimated "time to service" is calculated for work items requiring multiple skills for service based on the weighting of those skill requirements, the number of work items waiting for service and their skill requirement weighting, and "time to service" of work items already distributed to resources.

The "time to service" calculation is based on a single vector, allowing for easy distribution of workflow across multiple sites and centralization of the site selection decision.

While the invention has been characterized in terms of a method, it also encompasses apparatus that performs the method. The apparatus preferably includes an effector—any entity that effects the corresponding step, unlike a means—for each method step. The invention further encompasses a computer-readable medium containing instructions which, when executed in a computer, cause the computer to perform the method steps.

These and other features and advantages of the invention will become more apparent from a description of an illustrative embodiment of the invention considered together with the drawing.

BRIEF DESCRIPTION OF THE DRAWING

FIG. 2 is a block diagram of a work-item classification of the system of FIG. 1;

FIG. 3 is a block diagram of a resource qualification of the system of FIG. 1;

DETAILED DESCRIPTION

1. The Environment

Figure 1:
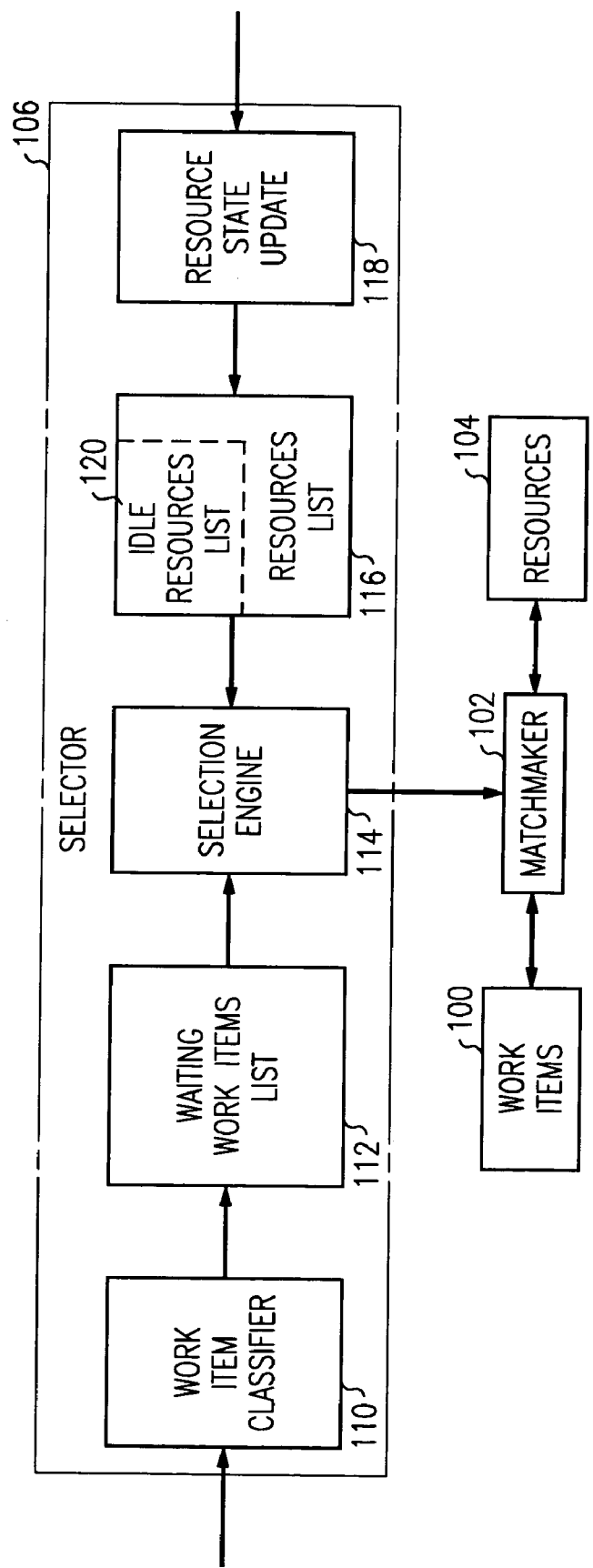
FIG. 1 is a block diagram of a work-processing system that includes an illustrative embodiment of the invention.

FIG. 1 shows an illustrative work processing system that comprises work items 100 waiting to be processed, resources 104 that process work items 100, a match-maker 102 that assigns individual work items 100 to individual resources 104 for processing, and a selection arrangement (SELECTOR) 106 that controls match-maker 102 and determines which work item 100 should be assigned to which resource 104. By way of one example, the processing system may be a call center wherein work items 100 comprise waiting communications, resources 104 comprise agents and interactive response systems, match-maker 102 comprises an automatic communications distributor (ACD), and selection arrangement 106 comprises either an adjunct processor to the ACD or a control program residing in memory of the ACD and executing on a processor of the ACD. As described so far, the work processing system of FIG. 1 is conventional.

2. Selection Arrangement Algorithm

The goal of selection arrangement 106 is to match work items 100 and resources 104 in a way that it brings the most value to all of the stakeholders in the work processing system. This includes customers, resources, managers, etc. According to the invention, to perform this optimization, selection arrangement 106 evaluates three components of a work item 100-to-resource 104 match.

2.1 The Three System Values 2.1.1 Business Value BV

The business value (BV) of a work item 100-to-resource 104 match is a measure of resource 104 qualification for work-item 100 handling based on resource 104 skills and skill proficiencies and work-item 100 skill requirements.

2.1.2 Resource Treatment Value RTV

The resource treatment value (RTV) of a work item 100-to-resource 104 match is a measure of how a resource 104 is spending time compared with other resources 104, as well as individual resource 104 goals.

2.1.3 Work Item Treatment Value WTV

The work item treatment value (WTV) of a work item 100-to-resource 104 match is a measure of how a work item 100 is treated compared to other work items 100, as well as individual treatment goals for the specific work item 100.

2.2 The Two Basic System States

Evaluation of the three system values discussed above depends on the state of the work processing system at the time of evaluation. The two possible states for a system and their effect on the application of the three system values is described next.

2.2.1 Resource Surplus RS

If there are idle resources 104 waiting for a work item because there are no waiting work items 100 for which the idle resources 104 have the "required" skills or there are no waiting work items 100 at all, the system is considered to be in a state of resource surplus (RS). In the case of resource surplus, when a work item 100 arrives in the system, the objective is to find the best resource 104 to handle the work item 100. So, one would evaluate the business value and the resource treatment value of each resource 104 matched with the new work item 100, looking for the resource 104-to-work item 100 match that brought the highest value to the organization. For this case of resource surplus, work item treatment is not an issue because the work item 100 will receive immediate handling, provided that there is a resource 104 available with the required skills.

2.2.2 Work Item Surplus WS

If there are no idle resources 104 in the system or there are no idle resources 104 that have the required skills to service any waiting work items 100 and there are work items 100 waiting for resource 104 assignment, the system is considered to be in a state of work item surplus (WS). In the case of work item surplus, when a resource 104 becomes available to handle work items 100, the objective is to find the best work item 100 for the resource 104 to handle. So, one would evaluate the business value and the work item treatment value of each work 100 item matched with the newly-available resource 104, looking for the resource 104-to-work item 100 match that brings the highest value to the organization. For the case of work item surplus, resource treatment is not an issue, because the resource 104 will receive the work item 100 immediately upon becoming available, provided that there is a work item 100 available for which the resource 104 has the required skills.

2.3 Calculation of Business Value

Assume that a matrix $A_{availresources,maxskills}$, where $_{availresources}$ is the number of available resources 104 and $_{maxskills}$ is the maximum number of skills defined in the system, represents the available resources 104 and their associated skill levels such that $A_{n,m}$ represents the skill level (an integer between 0 and 10, for example) for resource n and skill m.

Also, assume that a matrix $BR_{pendingworkitems,maxskills}$, where $_{pendingworkitems}$ is the number of unserviced work items 100 in the system and $_{maxskills}$ is the maximum number of skills defined in the system, represents the skill weight of the work item 100 such that $BR_{n,m}$ represents the skill weight (an integer between 0 and 10) for work item n and skill m.

Lastly, assume that a matrix $BRR_{pendingworkitems,maxskills}$, where $_{pendingworkitems}$ is the number of unserviced work items 100 in the system and $_{maxskills}$ is the maximum number of skills defined in the system, represents the requirement of a skill for a work item 100 such that $BRR_{n,m}$ (true of false) indicates whether a resource 104 must have a skill level>0 in skill m to handle work item n. This array is not used in the calculation of business value, but is used farther below.

2.3.1 Resource Surplus

In the case of resource surplus system state, the business value of a resource 104 is calculated as:

$$\text{Business Value}_{Resource_n} = \sum_{i=1}^{maxskills} (A_{n,i} \times BR_{1,i}) = RSBV_n$$

2.3.2 Work Item Surplus

In the case of work item surplus system state, the business value of a work item 100 is calculated as:

$$\text{Business Value}_{WorkItem_n} = \sum_{i=1}^{maxskills} (A_{1,n} \times BR_{n,i}) = WSBV_n$$

2.4 Calculation of Resource Treatment Value

Assume that a matrix $T_{availresources,3}$, where $_{availresources}$ is the number of resources 104 in the system waiting to service work items 100, represents each resource's activity during the current login session by $T_{n,1}$=time in seconds since becoming available, $T_{n,2}$=percent of logged-in time not spent serving work items 100 (serving time being the work items' handling time and the work items' associated after-call work), and $T_{n,3}$=a measure of how much serving of the available work item 100 would move this resource toward its goal (See section on Calculating and Setting Resource Goals.) Other and/or additional treatment metrics may be used, as desired.

Next, assume that a matrix $TW_{pendingworkitems,3}$ represents the weights to be applied to the treatment values T of resources 104 such that $TW_{n,m}$ is the weight for resource n to be applied to $T_{n,m} \forall m$, where $1 \leq m \leq 3$.

Now, the resource treatment value of a resource 104 is calculated as:

$$ResourceTreatmentValue_{Resource_n} = \sum_{i=1}^{3} (T_{n,i} \times TW_{n,i}) = RTV_n$$

2.5 Calculating and Setting Resource Goals

Let $G_{maxskills,numresources}$ be a vector containing percent allocation goals up to $_{maxskills}$ for each resource 104 such that $$\sum_{i=1}^{maxskills} G_{n,i} = 1, \forall n, \text{ where } n \leq numresources$$

Now, let $TT_{numresources,maxskills}$ be a vector containing the total time spent by each resource 104 in processing work items 100. This vector is updated as follows:
1. Resource r finishes processing a work item wi.
2. Work item wi has skill weight vector BRwi.
3. Total time of processing Tp is recorded.
4. TT is updated as $$TT_{r,n} = TT_{r,n} + T_p, \forall n, \text{ where } 0<n<maxskills \text{ and } BR_{wi,n}>0$$

Now, the total time spent handling each skill is available for each resource 104. This total time, along with a prospective new work item 100 and percent allocation goals can be used to calculate whether handling this work item 100 helps or hurts the resource 104 in moving toward the allocation goal as follows:

Let $PA_{n,maxskills}$ be the actual percent allocation for resource n such that:

$$PA_{n,i} = \frac{TT_{n,i}}{\sum_{j=1}^{maxskills} TT_{n,j}}$$

Now, the present distance of resource n from its goal is calculated as:

$$DG_n = \sum_{i=1}^{maxskills} |PA_{n,i} - G_{n,i}|$$

Now, let Tt be the total time that resource 104 has been handling work items 100, and let $T_{wi}$ be the total number of work items 100 handled by resource 104. Then, $$T_{avg} = \frac{T_t}{T_{wi}}.$$

Lastly, let $TTE_{n,maxskill}$ be the estimated total time, and $PAE_{n,i}$ be the estimated percent allocation for resource n if it handles work item $wi_{new}$ with skill vector $BR_{new}$ such that:

$$TTE_{n,i} = TT_{n,i} + T_{avg}, \forall i, \text{ where } 0<i<maxskills \text{ and } BR_{new,i}>0$$

$$PAE_{n,i} = \frac{TTE_{n,i}}{\sum_{i=1}^{maxskills} TTE_{n,j}}$$

Now, the estimated distance of resource n is from its goal is calculated as:

$$DGE_n = \sum_{i=1}^{maxskills} |PAE_{n,i} - G_{n,i}|$$

Now, improvement vs. goal can be expressed as:

Improvement=$DG_n - DGE_n$ where negative values indicate moving away from the goal and positive values indicate moving toward the goal. However, this would cause some ambiguity in later calculations. So, the improvement measurement is shifted to ensure a positive value as follows:

Improvement=$T_{n,3}$=$DG_n - DGE_n$+2×maxskills

This yields values between zero and 4×maxskills. This value will be adjusted in later calculations for practical use.

2.6 Calculation of Work Item Treatment Value

Assume that a matrix $C_{pendingworkitems,3}$, where $_{pendingworkitems}$ is the number of work items 100 awaiting service in the system, represents each work item's present waiting condition by $C_{n,1}$=time in seconds that the work item 100 has been waiting for service, $C_{n,2}$=the estimated time in seconds that the work item 100 will have to wait for service (see section on Calculating Estimated Wait for Service), and $C_{n,3}$=the time in seconds that the work item 100 is over its target wait time (or zero if not over target wait time). Additional and/or other treatment metrics may be used, as desired.

Also, assume that a matrix $CW_{pendingworkitems,3}$ represents the weights to be applied to the treatment values C such that $CW_{n,m}$ is the weight for resource n to be applied to $C_{n,m} \forall m$, where $1 \leq m \leq 3$.

Now we can calculate the work item treatment value of a work item 100 as:

$$WorkItemTreatmentValueWorkItem_i = \sum_{i=1}^{3} (C_{n,i} \times CW_{n,i}) = WTV_n$$

2.7 Calculating Estimated Wait for Service

Calculation of the estimated wait for service is accomplished with a moving average of past wait times, weighted across the list of skills and skill requirements as follows:

First, let $F_{maxskills}$ be a vector for holding moving averages of past wait times (one moving average for each skill, up to $_{maxskills}$), let AW be the average number of work items 100 waiting for service, and let TWWI be the total number of waiting work items 100. Now, every time that a work item wi, having waited time WT, is assigned to a resource 104, F and AW are updated by:

$$F_i = F_i \times (100 - BR_{wi,i}) + WT \times \frac{BR_{wi,i}}{100}, \forall i, \text{ where } 1 < i < maxskills$$

$$AW = AW \times 0.9 + TWWI \times 0.1$$

So, not only is this a moving average, it is also a variable moving average with new work items 100 contributing to the moving average between 0 and 10 percent based on their skill needs and weights.

Now, calculating estimated wait for service EWS based on a present work item wi and its skill requirements vector BRR is done as follows:

$$EWS_n = C_{n,2} = \frac{TWWI}{AW} \sum_{i=1}^{maxskills} \frac{BR_{wi,i}}{\sum_{j=1}^{maxskills} BR_{wi,j}} \times F_i$$

Under normal operating conditions, $$\frac{TWWI}{AW}$$

will be close to 1. However, in the event of a large spike in work volume or a large drop-off in work volume, this will adjust the estimate based on slow-moving averages to more accurately reflect the state of the system.

3. Making the Decision

One final thing remains for resource 104 or work-item 100 selection. The weight of the business value vs. resource treatment value in the case of resource surplus, and the weight of business value vs. work item treatment value in case of work item surplus. Define $W_{RSBV}$=weight of business value with resource surplus, $W_{AT}$=resource treatment value with resource surplus, $W_{WSBV}$=weight of business value with work-item surplus, and $W_{CV}$=weight of work-item treatment value in the case of work-item surplus. These are administrable values.

3.1 Resource Surplus and Resource Selection

For the case of resource surplus, we seek to maximize the business value and resource treatment value according to the specified weights by selecting resource 104 that scores the highest as follows:

Max[(RSBV$_n \times$W$_{RSBV}$)+(RTV$_n \times$W$_{AT}$)], where
A$_{n,i}$>0∀BRR$_{I,i}$>0

3.2 Work Item Surplus and Work Item Selection

For the case of work item surplus, we seek to maximize the business value and work item treatment value according to the specified weights by selecting work item 100 which scores the highest as follows:

Max[(WSBV$_n \times$W$_{WSBV}$)+(WTV$_n \times$W$_{CV}$)], where
A$_{I,i}$>0∀BRR$_{n,i}$>0

3.3 Optional: Dynamic Business Value and Work Item Treatment Weights

An option to setting predefined weights for business value and work item treatment value in the case of work item surplus is to allow the values to change over time. This change increases the weight of the work item treatment value over time in order to prevent starvation and move closer to the work item's target service time. In this scenario, work items 100 would have initial values of $W_{RSBV}=1$ and $W_{CV}=0$. These values would then change over time (during each evaluation) as:

$$W_{CV} = \frac{\text{present wait time}}{\text{target wait time}}$$

or 1, whichever is greater, and $$W_{RSBV} = 1 - W_{CV}$$

This would start the calculation with the most weight on the skills of resource 104 and move to applying the most weight to ensuring fair treatment of work item 100.

4. Scaling Results for Practical Application

The above algorithm selects a resource 104 or a work item 100 based on a highest score. However, determining the weights of each of the values that result in an optimum solution for the system can be impractical. For instance, if resource 104 scores very high in business value (10×10=100) but work items 100 have been waiting for an average of 5 minutes, the work item treatment value (WTV) could be as high as 300. So, as work items 100 age, the WTV has an increased effect on the overall selection. This is undesirable.

So, to be practically more applicable, the calculation of each of the selection values must be scaled. One will need a scaling value for each of the calculations that are performed either for all resources 104 or all work items 100 as follows (denoting scaling values as S):

$$S_{RSBV} = \frac{100}{\text{Max}[RSBV_n]}$$

$$S_{WSBV} = \frac{100}{\text{Max}[RSBV_n]}$$

$$S_{Ti} = \frac{100}{\text{Max}[T_{n,i}]}, 1 \le i \le 3$$

$$S_{Ci} = \frac{100}{\text{Max}[C_{n,i}]}, 1 \le i \le 3$$

$$S_T = \frac{100}{\text{Max}[T_n]}$$

$$S_C = \frac{100}{\text{Max}[C_n]}$$

Now, one can express the scaled values for RSBV, WSBV, RTV, and WTV as follows:

ScaledBusinessValue$_{Resource_n}$=S$_{RSBV}$RSBV$_n$=WRSBV$_n$

ScaledBusinessValue$_{WorkItem_n}$=S$_{WSBV}$WSBV$_n$=WWSBV$_n$

PartialScaledResourceTreatmentValue$_{Resource_n}$ =

$$\sum_{i=1}^{3} (S_{Ti} \times T_{n,i} \times TW_{n,i}) = PWRTV_n$$

PartialScaledWorkItemTreatmentValue$_{WorkItem_n}$ =

$$\sum_{i=1}^{3} (S_{Ci} \times C_{n,i} \times CW_{n,i}) = PWWTV_n$$

ScaledResourceTreatmentValue$_{Resource_n}$=PWRTV$_n$S$_T$=WRTV$_n$

ScaledWorkItemTreatmentValue$_{WorkItem_n}$=PWWTV$_n$S$_C$=WWTV$_n$

The net result of the calculation is that each of the scaled values WRSBV, WWSBV, WRTV, and WWTV is between 0 and 100. Now, regardless of the units of measure or scaling internal to each of the value's initial configuration, one can consistently express the weight that these values have on the overall resource 104 and work item 100 selection.

Max[(WRSBV$_n$×W$_{RSBV}$)+(WRTV$_n$×W$_{AT}$)], where $A_{n,i}>0 \forall BRR_{I,i}>0$.

Max[(WWSBV$_n$×W$_{WSBV}$)+(WWTV$_n$×W$_{CV}$)], where $A_{I,i}>0 \forall BRR_{n,i}>0$.

Note that the weighting for the components of resource treatment value ($T_{n,i}$) and work item treatment value ($C_{n,i}$) are scaled by the above calculations as well.

5. An Example

Look at an example of resource surplus (Resource Selection) work item 100-to-resource 104 matching to illustrate the concepts defined above. Assume that we have two resources 104, Jane and Jeff. And, we have skills 1–6, English, Chinese, Tech-support, Sales, PC, and UNIX. Jeff speaks English well (skill level 10), speaks Chinese (skill level 5), and has been trained in tech support (skill level 8) and UNIX (skill level 10). Jane speaks English (skill level 10), is trained and experienced in Sales (skill level 10), is just learning tech support (skill level 2), and has experience in PC (skill level 7) and UNIX (skill level 6). Also, assume that both Jeff and Jane have logged in and are waiting to receive work items 100.

Now, the matrix A of available resources looks like this:

$$A = \begin{bmatrix} 10 & 5 & 8 & 0 & 0 & 10 \\ 10 & 0 & 2 & 10 & 7 & 6 \end{bmatrix}$$

Further assume that Jeff has been idle for 1 minute and has been on calls 75% of the day. Jane has been idle for 3 minutes and on calls 50% of the day. Now, the matrix T looks like this:

$$T = \begin{bmatrix} 60 & 25 & 0 \\ 180 & 50 & 0 \end{bmatrix}$$

Now, a work item 100—a call—arrives in the system. The work item is qualified with the following requirements: English (weight 10), Tech support (weight 10), and UNIX (weight 5). All three of these skills are required. Now, the matrix BR and matrix BRR look like this:

BR=[10 0 10 0 0 5]

BRR=[1 0 1 0 0 1]

Lastly, when the work item 100 arrives, it is assigned the following weights:

TW=[0.25 0.75 0]

$W_{RSBV}$=0.2

$W_{AT}$=0.8

Now, one can calculate the best selection as:

$$RSBV_{Jeff} = 230$$

$$RSBV_{Jane} = 150$$

$$WRSBV_{Jeff} = 230\frac{100}{230} = 100$$

$$WRSBV_{Jane} = 150\frac{100}{230} = 65.22$$

$$PWRTV_{Jeff} = \frac{100}{180}(60)(.25) + \frac{100}{50}(25)(.75) + 0 = 45.83$$

$$PWRTV_{Jane} = \frac{100}{180}(180)(.25) + \frac{100}{50}(50)(.75) + 0 = 200$$

$$WRTV_{Jeff} = \frac{100}{200}(45.83) = 22.92$$

$$WRTV_{Jane} = \frac{100}{200}200 = 100$$

Total value for Jeff:

100(0.2)+22.92(0.8)=40.33

Total value for Jane:

65.22(0.2)+100(0.8)=93.044

Therefore, Jane is selected to handle the work item. Note that Jeff scored higher in business value and Jane scored higher in resource fairness value. However, due to the 80% weight on the resource fairness value, the work item was delivered to Jane.

6. Selection Arrangement Realization 6.1. Resources list

In order to evaluate a resource 104 and assign it to the best work items 100, it must be presented to the system classified according to its specific capabilities for service. Selection arrangement 106 of FIG. 1 therefore includes a list 116 of all resources 104 in the system of FIG. 1 and of their qualifications. These qualifications include both relatively static as well as dynamic data, and are illustrated in FIG. 2. Qualifications 200 for each resource 104 include a skills vector 202, which is a list of all of the skills possessed by resource 104. Qualifications 200 for each resource 104 further include a skill-level vector 204, which indicates the level of skill of this resource 104 for each skill possessed by this resource 104, and a skill allocation goals vector 206, which indicates present allocation goals for all skills possessed by this resource 104. These are relatively static, administered, values. Qualifications 200 further include measured values, such as a skill times vector 208 which indicates for each skill the total amount or percentage of time spent by this resource 104 in processing work items 100 that needed this skill. (If a work item 100 processed by a resource 104 requires a plurality of skills of that resource 104, each required skill's skill time is credited with the time that resource 104 spent processing the work item 100.) Measured values further include a worktime vector 210 which indicates one or more of the following: the total time that resource 104 has been logged in, the total time that resource 104 has spent in live communication with customers (in-call time), the total time other than in-call time that resource 104 has spent processing calls (ACW time), the total time that resource 104 has been busy, the total time that resource 104 has been ready to process work items 100, and the total time (TP) that resource 104 has spent processing work items 100. The metrics of worktime vector 210 correspond to like metrics that are conventionally maintained for agents in ACD systems, and are computed in the same manner. Qualifications 200 further include state information 212 that indicates the present state of the corresponding resource 104 and the time of the last state change of resource 104. The latter value is used to determine the amount of time that resource 104 has been idle since last processing a work item 100. Idle resources 104 form an idle resource list 120 which is a subset of resource list 116.

6.1.1 Unitary Skills

Unitary skills are individual, independent skills. Skills such as English, Spanish, Sales, Tech Support, UNIX, Windows, and Macintosh fall into this category. These are also the most simple to administer. Each skill is assigned a number starting at 1 such that $A_{n,m}$ represents the skill level of resource n for the skill m.

6.1.2 Aggregate Skills

Aggregate skills are slightly more difficult to work with. They are skills that are made up of combinations of unitary skills, described above. Aggregate skills are needed in that there may be a resource 104 capable of handling several skills individually and only in certain combinations. For instance, suppose that there is an agent in a call center who speaks Spanish and knows UNIX, Windows, and Macintosh. Also, suppose that this agent has had some technical support training and therefore is skilled in tech support as well. However, this agent is being eased into the tech support role. For the first two weeks the agent should only handle Spanish tech support calls for Windows. During the following two weeks, the agent can also take Spanish tech support calls for Macintosh. Finally, the agent is also allowed to handle Spanish tech support calls for UNIX. This scenario is most easily administered with three aggregate skills: Spanish Windows Tech Support, Spanish Macintosh Tech Support, and Spanish UNIX Tech Support.

Now, more generally, aggregate skills are administered as follows. Suppose that some aggregate skill g is an aggregate of unitary skills a, b, and c. Now, $A_{n,g}$ represents the skill level of resource n for aggregate skill g, where g>maxunitskills, and maxunitskills is the total number of unitary skills.

This allows for further differentiation of resources 104 by ability to handle not only individual skill requirements but skill requirement combinations as well.

6.2 Resource State Update

Dynamic items 206–212 of qualifications 200 of all resources 104 in resource list 116 are dynamically updated and kept current by a resource state update 118 in FIG. 1. Resource state update 118 provides an interface to which applications can send information to update the state of resources 104 as necessary. Resource state update 118 receives the notifications of resource 104 state-change events and updates list 116 and 120 contents accordingly.

6.3 Work Item Classifier

In order to evaluate a work item 100 and distribute it to the best resource 104, it must be presented to the system fully classified according to its specific needs for service. This classification is performed by work item classifier 110 in FIG. 1. Classifications 300 that classifier 110 needs to provide for each work item 100 are outlined below and are illustrated in FIG. 3.

6.3.1. Qualifying for Calculation of Business Value

Each work item's classification 300 includes a skills vector 302, which is a list of all possible skills 1–M that a work item 100 can have. Each skill that is required or simply desired for the handling of a work item 100 must be added to the work item classification 300 for each of the categories below.

6.3.1.1 Unitary Skills

Each qualification 300 includes a BR vector 306, which is a list of the skill weights assigned for this work item 100 to each of the skills in skills vector 302. For each unitary skill associated with work item n, a weight (illustratively an integer between 0 and 10) is assigned such that $BR_{n,m}=w$ where $1 \leq m \leq$ maxunitskills, $0 \leq w \leq 10$, and maxunitskills is the number of unitary skills.

6.3.1.2 Aggregate Skills

BR vector 306 includes both unitary skills and aggregate skills. For each aggregate skill associated with work item n, a weight (integer between 0 and 10) is assigned such that $BR_{n,m}=w$ where maxskills$<m \leq$ maxskills, $0 \leq w \leq 10$, and maxskills is the total number of unitary and aggregate skills combined.

6.3.1.3 Skill Requirements

Each classification 300 includes a BRR vector 304 indicating which of the skills in skill vector 302 are required by this work item 100. For each skill, both aggregate and unitary, associated with work item n, a value of true or false must be assigned to BRR such that $BRR_{n,m}$ indicates whether or not a skill m is required for work time n. Vectors 302, 304 and 306 together represent a business value of work item 100. Note that it is possible for a skill to contribute to the business value calculation but not be a required skill. For example, suppose that some agents in a call center had been trained in effective communication, but this is not required to handle a call. Those agents could score higher in business value, having had that training. However, agents who were not trained would not be excluded from the selection process if the skill had a weight>0 in BRR but not a value of true in the requirements vector BRR.

6.3.2 Qualifying Weights for Resource Fairness Values

Each classification 300 includes a qualifying weights for resource fairness values (QWRFV) vector 308. The values, for resource n, of $TW_{n,m}$ must be filled in for fairness values one through three ($1 \leq m \leq 3$.) $TW_{n,1}$ is the weight to be given to the time since resource n has become available, $TW_{n,2}$ is the weight to be given to the percentage of time that resource n has not spent handling work items 100, $TW_{n,}$ is the weight to be given to how much the processing of the current work item 100 would move resource 104 toward its service objective. Although the values of TW can be anything, it is most appropriate to imagine that $$\sum_{i=1}^{i=3} TW_{n,i} = 1$$

for a percentage weight of each of the values for some resource n. In the simple default case, it is expected that a work item 100 will have only one set of TW values in common for all resources 104.

6.3.3 Qualifying Weights for Work Item Fairness Values

Each classification 300 includes a qualifying weights for work item fairness values (QWWIFV) vector 312. As with resources above, the values, for work item n, of $CW_{n,m}$ must be filled in for fairness values one through three ($1 \leq m \leq 3$). $CW_{n,1}$ is the weight to be given to time that work item 100 has spent waiting for processing, $CW_{n,2}$ is the weight to be given to the work item's estimated total wait time, and $CW_{n,3}$ is the weight to be given to the waiting time by which work item 100 has exceeded its target service time. Although the values of CW can be anything, it is most appropriate to imagine that $$\sum_{i=1}^{i=3} TW_{n,i} = 1$$

for a percentage weight of each of the values for some resource n.

6.3.4 Qualifying Weights for Business Value

When classifier 110 passes a new work item 100 to the system for distribution, it is assumed that classifier 110 knows nothing of the state of the system and therefore must provide enough information to make a decision in any state.

6.3.4.1 Resource Surplus

To be able to make a decision in a resource surplus state, each classification 300 provides resource surplus weights 314 that include the weight of business value with resource surplus WRSBV, and the weight of resource fairness with resource surplus $W_{AT}$.

6.3.4.2 Work Item Surplus

To be able to make a decision in a work item surplus state, each classification 300 provides work-item surplus weights 316 that include the weight of business value with work-item surplus $W_{WSBV}$, and the weight of work-item fairness with work-item surplus $W_{CV}$.

6.3.5 Qualifying Target Wait Time

Lastly, each classification 300 provides the target wait time for work item 100, Target 318.

6.3.6 Classification Generation

Illustratively, values 308–318 are pre-administered for different business values (values of fields 302–306), so that classifier 110 need only determine the business values (values of fields 302–306)—illustratively in the same manner as is done in conventional skills-based ACD systems—and then populates fields 308–318 with the corresponding administered values.

6.4. Selection Engine

Figure 4:
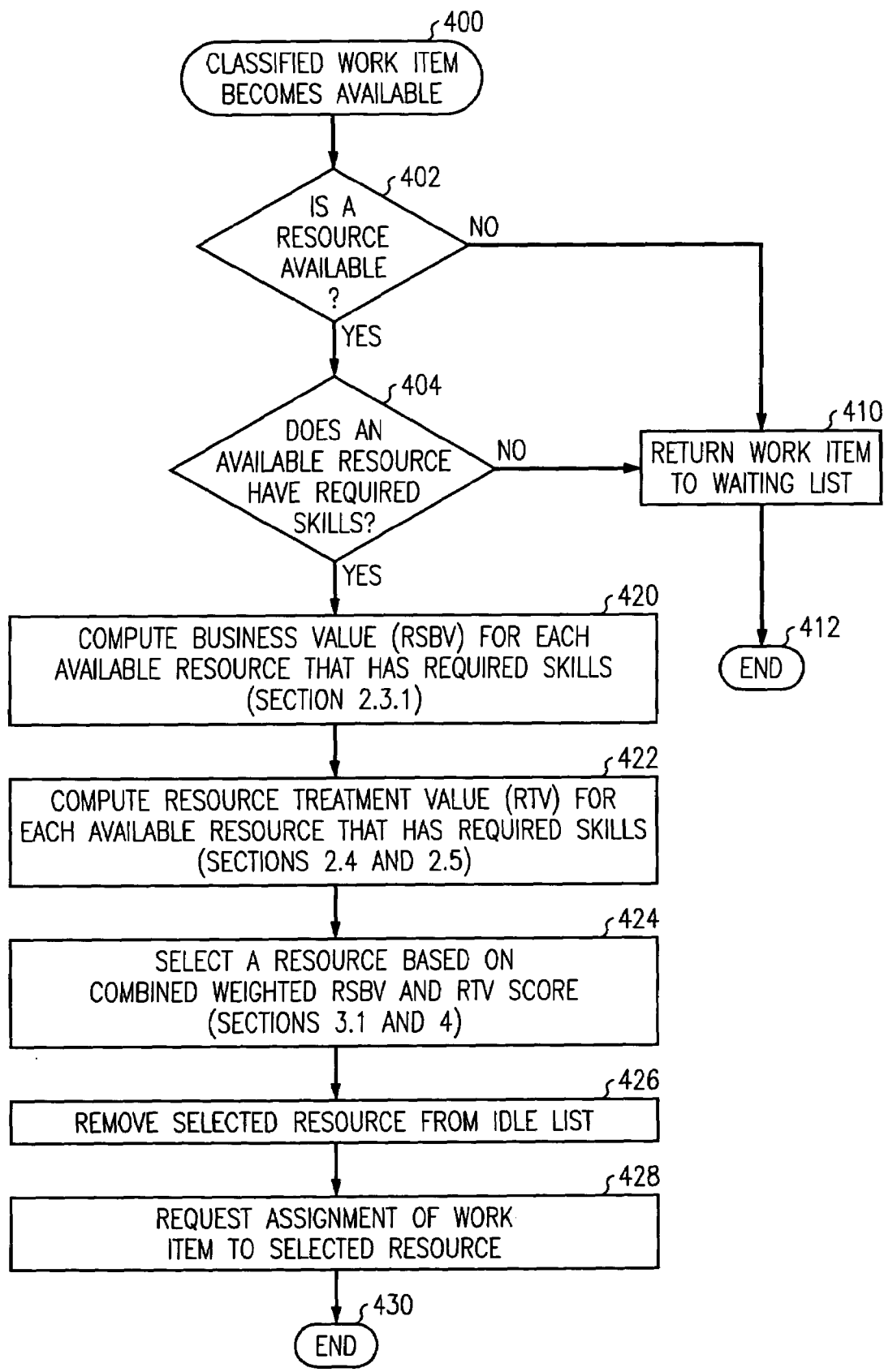
FIG. 4 is a functional flow diagram of operations of a selection engine of the system of FIG. 1 in times of resource surplus.
Figure 5:
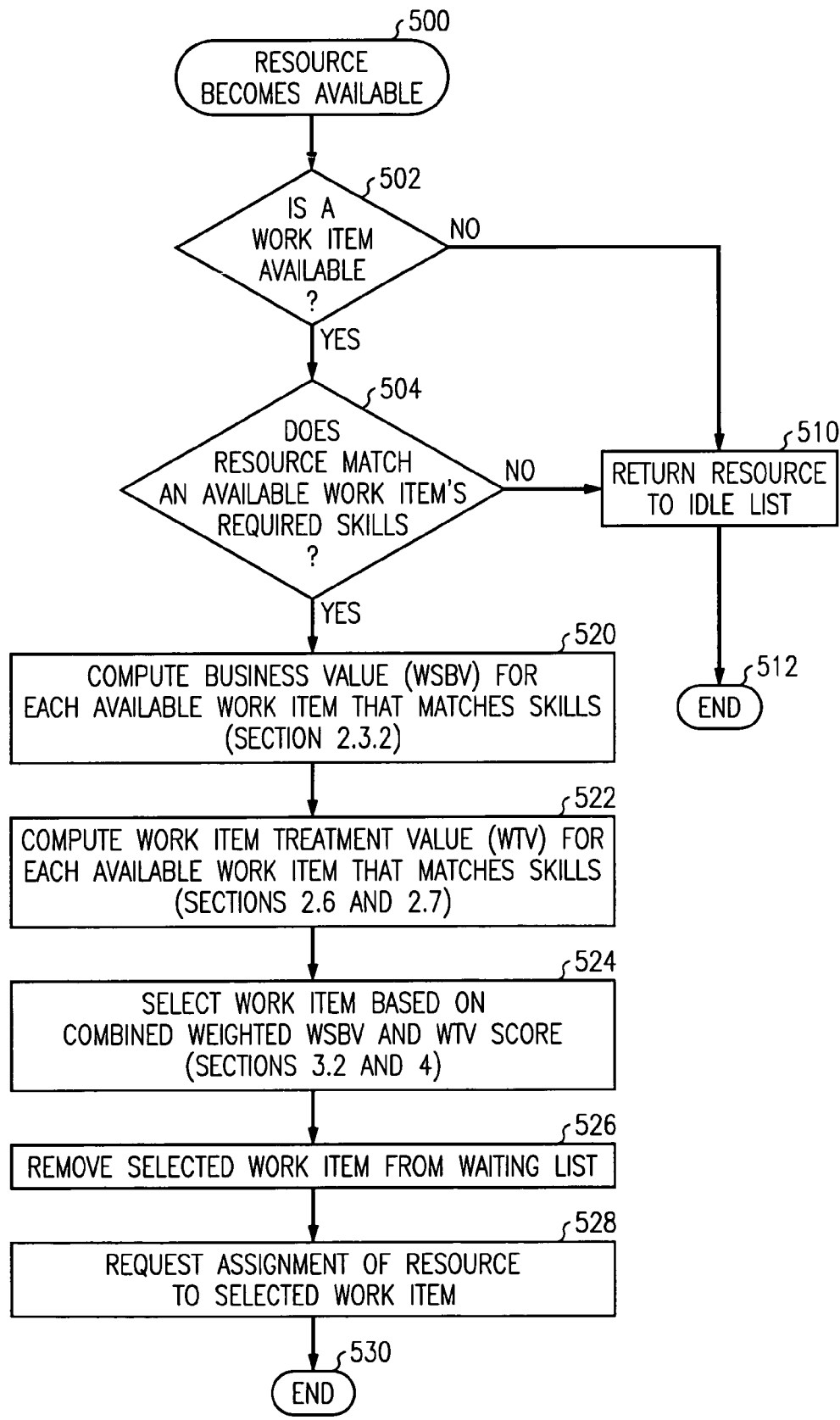
FIG. 5 is a functional flow diagram of operations of the selection engine of the system of FIG. 1 in times of work-item surplus.

FIGS. 4 and 5 show an illustrative implementation of selection engine 114. FIG. 4 shows the operation of engine 114 when a classified work item 100 becomes available, while FIG. 5 shows its operation when a resource 104 becomes available.

6.4.1. Resource Surplus

When a classified work item 100 is or becomes available in waiting work-items list 112, at step 400, engine 114 checks idle resources list 120 to determine if any resource 104 is available to handle the work item, at step 402. If idle resources list 120 is empty, engine 114 returns work-item 100 to list 112, at step 410, and ends its operation, at step 412, until such time as a resource 104 becomes available. If idle resources list 120 is not empty, engine 114 compares skills requirements 304 of the work item's classification 300 with the skill levels 204 of the available resources' qualifications 200 to determine if an available resource 104 has the skills that are required by available work item 100, at step 404. If not, engine 114 proceeds to steps 410 et seq., if so, engine 114 proceeds to step 420 et seq.

At step 420, engine 114 computes the business value (RSBV) for each available resource 104 that has the skills required by available work item 100. The computation is effected as described in Section 2.3.1 above. Engine 114 then computes the resource treatment value (RTV) for each available resource 104 that has the required skills at step 422. The computation is effected as described in Sections 2.4 and 2.5 above. Engine 114 then selects an available resource 104 based on the combined weighted RSBV and RTV score, at step 424. This computation and selection is effected as described in Section 3.1 above. Engine 114 then removes the selected resource from idle resources list 120, at step 426, requests match-maker 102 to assign available work item 100 to selected resource 104, at step 428, and ends its operation, at step 430, until another classified work item 100 or resource 104 becomes available.

6.4.2 Work-Item Surplus

When a resource 104 is or becomes available on idle resources list 120, at step 500, engine 114 checks waiting work items list 112 to determine if any work item 100 is available for handling, at step 502. If waiting work items list 112 is empty, engine 114 returns resource 104 to list 120, at step 510, and ends its operations until such time as a work item 100 becomes available, at step 512. If waiting work items list 112 is not empty, engine 114 compares skill levels 204 of the resource's qualifications 200 with the skills requirements 304 of the available work items' classifications 300 to determine if the resource's skills match the skill requirements of an available work item 100, at step 504. If not, engine 114 proceeds to steps 510 et seq.; if so, engine 114 proceeds to steps 520 et seq.

At step 520, engine 114 computes the business value (WSBV) for each available work item 100 whose skill needs match the skills of resource 104. The computation is effected as described in Section 2.3.1 above. Engine 114 then computes the work-item treatment value (WTV) for each available work item 100 whose skill needs match the skills of resource 104, at step 522. The computation is effected as described in Sections 2.6 and 2.7 above. Engine 114 then selects an available work item 100 based on the combined weighted WSDV and WTV score, at step 524. This computation and selection is effected as described in Section 3.2 above. Engine 114 then removes the selected work-item 100 from waiting work items list 112, at step 526, requests match-maker 102 to assign available resource 104 to selected work item 100, at step 528, and ends its operation, at step 530, until another resource 104 or classified work item 100 becomes available.

6.5 Variants

Of course, various changes and modifications to the illustrative embodiment described above will be apparent to those skilled in the art. For example, the compact nature of the algorithms allows for distribution of the system across multiple sites. If would be quite effective for multiple sites to update present values of their forecast vector F, their average number of waiting work items AW, the number of current waiting work items TWWI, and a vector indicating serviceable skills (to avoid sending a work item to a site that cannot service it) at a central location. This central location would then have enough information to distribute work items across the multiple sites based on estimated time to service. Or, this information could be delivered to the appropriate site initially by an external process accessing this central location (i.e., a pre-route solution). Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of selecting a resource for a work item, comprising:

determining by processor available resources that possess skills needed by the work item;

for each of the determined resources, determining by processor a business value RSBV of having the resource service the work item, the business value being a measure of qualification of the resource for servicing the work item based on skills of the resource and skill requirements of the work item, wherein $$RSBV_n = \sum_{i=1} (A_{n,i} x BR_{1,i}),$$

where $A_{n,i}$ represents the skill level of resource n for skill i, and $BR_{1,i}$ represents a skill weight for the work item for skill i, across all defined skills;

for each of the determined resources, determining by processor a value RTV to the resource of servicing the work item, the value to the resource being a measure of how serving the work item by the resource helps or hurts goals of the individual resource, wherein $$RTV_n = \sum_{i=1} (T_{n,i} x TW_{n,i}),$$

where $T_{n,i}$ represents a value of resource n for a resource treatment i, and $TW_{n,i}$ represents a weight of resource n for resource treatment i, across all resource treatments; and selecting by processor a determined resource that has a best combined value of the business value and the value to the resource, to serve the work item.

2. The method of claim 1 wherein:

determining by processor a business value comprises determining by processor the business value weighted by a business value weight corresponding to the work item;

determining by processor a value to the resource comprises determining by processor the value to the resource weighted by a resource value weight corresponding to the work item; and selecting by processor comprises selecting by processor a determined resource that has a best combined value of the weighted business value and the weighted value to the resource.

3. The method of claim 2 wherein:

determining by processor a business value comprises determining by processor a weighted business value as a product of (a) the business value weight corresponding to the work item and (b) a sum of products of a level of each said needed skill of the resource and a weight of said needed skill of the work item; and determining by processor a value to the resource comprises determining by processor a weighted resource treatment value as a product of (c) a resource treatment weight corresponding to the work item and (d) a sum of products of each treatment of the resource and a weight of said treatment of the resource.

4. The method of claim 3 wherein:

the sums of products are scaled sums, and the treatments are scaled treatments.

5. The method of claim 4 wherein:

selecting by processor comprises selecting by processor the determined resource that has a highest sum of the weighted business value and the weighted resource treatment value.

6. The method of claim 3 wherein:

the resource treatments of a resource comprise a time since the resource became available and a time that the resource has not spent serving work items.

7. The method of claim 6 wherein:

the treatments of the resource further comprise a measure of an effect that serving of the work item would have on a goal of the resource.

8. The method of claim 7 wherein:

the measure of the effect comprises a difference between (a) a distance of an actual allocation of worktime of the resource among skills from a goal allocation of the worktime of the resource among the skills and (b) a distance of an estimated allocation of the worktime of the resource among the skills if the resource serves the work item from the goal allocation.

9. A method of selecting a resource for a work item, comprising:

determining by processor available resources that possess skills needed by the work item;

for each of the determined resources, determining by processor a business value RSBV comprising a sum $$\sum$$

across all skills i of a product of a skill level $A_{n,i}$ of the resource n in the skill and a skill weight $BR_{1,i}$ of the work item for the skill, wherein $$RSBV_n = \sum_{i=1} (A_{n,i} x BR_{1,i});$$

for each of the determined resources, determining by processor a resource treatment value RTV, the resource treatment value being a measure of how the resource is meeting goals of the individual resource, the resource treatment value comprising a sum $$\sum$$

across all of a plurality of resource treatments i of a product of a value $T_{n,i}$ of the resource n for the resource treatment and a weight $TW_{n,i}$ of the work item for how much weight said resource treatment has relative to others of the resource treatments, wherein $$RTV_n = \sum_{i=1} (T_{n,i} x TW_{n,i});$$

and selecting by processor a determined resource that has a best combined score of its business value and its resource treatment value, to serve the work item.

10. The method of claim 9 wherein:

the resource treatments of a resource comprise a time since the resource became available, a time that the resource has spent not serving work items, and a measure of an effect that serving the work item would have on a goal of the resource.

11. The method of claim 9 wherein:

determining by processor a business value comprises determining by processor a scaled business value comprising the business value scaled by a first scaling factor that is common to all of the determined resources;

determining by processor a resource treatment value comprises for each resource treatment, determining by processor a scaled value of the resource comprising the value of the resource for that resource treatment scaled by a scaling factor that is common for that resource treatment to all of the determined resources, and determining by processor a scaled resource treatment value comprising a sum, scaled by a second scaling factor that is common to all of the determined resources, across all resource treatments of a product of the scaled value of the resource for the resource treatment and a weight of the work item for the resource treatment; and selecting by processor comprises selecting by processor a determined resource that has a best sum of its scaled business value and its scaled resource treatment value to serve the work item.

12. The method of claim 11 wherein:

each scaling factor comprises a fraction having in its denominator a maximum value of the value to which said scaling factor applies of any of the resources.

13. A method of selecting a work item for a resource, comprising:

determining by processor available work items that need skills possessed by the resource;

for each of the determined work items, determining by processor a business value WSBV of having the resource service the work item, the business value being a measure of qualification of the resource for servicing of the work item based on skills of the resource and skill requirements of the work item, wherein $$WSBV_n = \sum_{i=1} (A_{1,i} x BR_{n,i}),$$

where $A_{l,i}$ represents the skill level of the resource for skill i, and $BR_{n,i}$ represents a skill weight for the work item n for skill i, across all defined skills;

for each of the determined work items, determining by processor a value WTV to the work item of being serviced by the resource, the value to the work item being a measure of how the work item is meeting goals of the individual work item, wherein $$WTV_n = \sum_{i=1} (C_{n,i} x CW_{n,i}),$$

where $C_{n,i}$ represents a value of a work item n for a work item treatment i, and $CW_{n,i}$ represents a weight of work item n for work item treatment i, across all work item treatments; and selecting by processor a determined work item that has a best combined value of the business value and the value to the work item to be served by the resource.

14. The method of claim 13 wherein:
determining by processor a business value comprises
determining by processor the business value weighted by a business value weight corresponding to the work item;
determining by processor a value to the work item comprises
determining by processor the value to the work item weighted by a work item value weight corresponding to the work item; and
selecting by processor comprises
selecting by processor a determined work item that has a best combined value of the weighted business value and the weighted value to the work item.

15. The method of claim 14 wherein:
determining by processor a business value comprises
determining by processor a weighted business value as a product of (a) the business value weight corresponding to the work item and (b) a sum of products of a level of each said needed skill of the resource and a weight of said needed skill of the work item; and
determining by processor a value to the work item comprises
determining by processor a weighted work item treatment value as a product of (c) a work item treatment weight corresponding to the work item and (d) a sum of products of each treatment of the work item and a weight of said treatment of the work item.

16. The method of claim 15 wherein:
the sums of products are scaled sums, and
the treatments are scaled treatments.

17. The method of claim 16 wherein:
selecting by processor comprises
selecting by processor the determined work item that has a highest sum of the weighted business value and the weighted work item treatment value.

18. A method of selecting a work item for a resource, comprising:
determining by processor available work items that need skills possessed by the resource;

for each of the determined work items, determining by processor a business value WSBV comprising a sum $$\sum$$

across all skills i of a product of a skill level $A_{l,i}$ of the resource n in the skill and a skill weight $BR_{n,i}$ of the work item for the skill, wherein $$WSBV_n = \sum_{i=1} (A_{1,i} x BR_{n,i});$$

for each of the determined work items, determining by processor a work item treatment value WTV, the work item treatment value being a measure of how the work item is meeting goals of the individual work item, the work item treatment value comprising a sum $$\sum$$

across all of a plurality of work item treatments i of a product of the value $C_{n,i}$ of the work item for the work item treatment and a weight $CW_{n,i}$ of the work item for how much weight said work item treatment has relative to others of the work item treatments, wherein $$WTV_n = \sum_{i=1} (C_{n,i} x CW_{n,i});$$

and
selecting by processor a determined work item that has a best combined score of its business value and work item treatment value, to be served by the resource.

19. The method of claim 18 wherein:
the work item treatments of a work item comprise a time that the work item has been waiting for service and an estimated time that the work item will have to wait for service.

20. The method of claim 19 wherein:
the work item treatments of a work item further comprise a time by which the work item has exceeded its target wait time.

21. The method of claim 19 wherein:
the estimated wait time that the work item will have to wait for service comprises a product of (a) a ratio of a total number of work items waiting for service and an average number of work items waiting for service and (b) a sum of average wait times of individual said needed skills each weighted by a ratio of the weight of said individual skill and a sum of the weights of the needed skills.

22. The method of claim 18 wherein:
the work item treatments of a work item comprise a time that the work item has spent waiting to be serviced, an estimated time that the item will spend waiting to be serviced, and a time by which the work item has exceeded its target waiting time.

23. The method of claim 18 wherein:
determining by processor a business value comprises
determining by processor a scaled business value comprising the business value scaled by a first scaling factor that is common to all of the determined work items;
determining by processor a work item treatment value comprises
for each work item treatment, determining by processor a scaled value of the work item comprising the value of the work item for that work item treatment scaled by a scaling factor that is common for that work item treatment to all of the determined work items, and
determining by processor a scaled work item treatment value comprising a sum, scaled by a second scaling factor that is common to all of the determined work items, across all work item treatments of a product of the scaled value of the work item for the work item treatment and a weight of the work item for the work item treatment; and
selecting by processor comprises
selecting by processor a determined work item that has a best sum of its scaled business value and its scaled work item treatment value, to be served by the resource.

24. The method of claim 23 wherein:
each scaling factor comprises a fraction having in its denominator a maximum value of the value to which said scaling factor applies of any of the work items.

25. An apparatus comprising a processor that executes instructions to effect the method of one of claims 1–24.

26. An apparatus for selecting a resource for a work item, comprising:
means for determining available resources that possess skills needed by the work item;
means for determining, for each of the determined resources, a business value RSBV of having the resource service the work item, the business value being a measure of qualification of the resource for servicing the work item based on skills of the resource and skill requirements of the work item, wherein $$RSBV_n = \sum_{i=1} (A_{n,i} x BR_{1,i}),$$

where $A_{n,i}$ represents the skill level of resource n for skill i, and $BR_{1,i}$ represents a skill weight for the work item for skill i, across all defined skills;
means for determining, for each of the determined resources, a value to the resource of servicing the work item, the value to the resource being a measure of how serving the work item by the resource helps or hurts goals of the individual resource, wherein $$RTV_n = \sum_{i=1} (T_{n,i} x TW_{n,i}),$$

where $T_{n,i}$ represents a value of resource n for a resource treatment i, and $TW_{n,i}$ represents a weight of resource n for resource treatment i, across all resource treatments; and
means for selecting a determined resource that has a best combined value of the business value and the value to the resource, to serve the work item.

27. An apparatus for selecting a resource for a work item, comprising:
means for determining available resources that possess skills needed by the work item;
means for determining, for each of the determined resources, a business value RSBV comprising a sum $$\sum$$

across all skills i of a product of a skill level $A_{n,i}$ of the resource n in the skill and a skill weight $BR_{1,i}$ of the work item for the skill, wherein $$RSBV_n = \sum_{i=1} (A_{n,i} x BR_{1,i});$$

means for determining, for each of the determined resources, a resource treatment value RTV, the resource treatment value being a measure of how the resource is meeting goals of the individual resource, the resource treatment value comprising a sum $$\sum$$

across all of a plurality of resource treatments i of a product of a value $T_{n,i}$ of the resource n for the resource treatment and a weight $TW_{n,i}$ of the work item for how much weight said resource treatment has relative to others of the resource treatments, wherein $$RTV_n = \sum_{i=1} (T_{n,i} x TW_{n,i});$$

and
means for selecting a determined resource that has a best combined score of its business value and its resource treatment value, to serve the work item.

28. An apparatus for selecting a work item for a resource, comprising:
means for determining available work items that need skills possessed by the resource;
means for determining, for each of the determined work items, a business value WSBV of having the resource service the work item, the business value being a measure of qualification of the resource for servicing of the work item based on skills of the resource and skill requirements of the work item, wherein $$WSBV_n = \sum_{i=1} (A_{1,i} x BR_{n,i}),$$

where $A_{1,i}$ represents the skill level of the resource for skill i, and $BR_{n,i}$ represents a skill weight for the work item n for skill i, across all defined skills;
means for determining, for each of the determined work items, a value WTV to the work item of being serviced by the resource, the value to the work item being a measure of how the work item is meeting goals of the individual work item, wherein $$WTV_n = \sum_{i=1}(C_{n,i} \times CW_{n,i}),$$

where $C_{n,i}$ represents a value of a work item n for a work item treatment i, and $CW_{n,i}$ represents a weight of work item n for work item treatment i, across all work item treatments; and means for selecting a determined work item that has a best combined value of the business value and the value to the work item to be served by the resource.

29. An apparatus for selecting a work item for a resource, comprising:

means for determining available work items that need skills possessed by the resource;

means for determining, for each of the determined work items, a business value WSBV comprising a sum $$\sum$$

across all skills i of a product of a skill level $A_{l,i}$ of the resource n in the skill and a skill weight $BR_{n,i}$ of the work item for the skill, wherein $$WSBV_n = \sum_{i=1}(A_{1,i} \times BR_{n,i});$$

means for determining, for each of the determined work items, a work item treatment value WTV, the work item treatment value being a measure of how the work item is meeting goals of the individual work item, the work item treatment value comprising a sum $$\sum$$

across all of a plurality of work item treatments i of a product of the value $C_{n,i}$ of the work item for the work item treatment and a weight $CW_{n,i}$ of the work item for how much weight said work item treatment has relative to others of the work item treatments, wherein $$WTV_n = \sum_{i=1}(C_{n,i} \times CW_{n,i});$$

and means for selecting a determined work item that has a best combined score of its business value and work item treatment value, to be served by the resource.

30. A computer-readable medium containing instructions which, when executed in a computer, cause the computer to perform selection of a resource for a work item, comprising:

determining available resources that possess skills needed by the work item;

for each of the determined resources, determining a business value RSBV of having the resource service the work item, the business value being a measure of qualification of the resource for servicing the work item based on skills of the resource and skill requirements of the work item, wherein $$RSBV_n = \sum_{i=1}(A_{n,i} \times BR_{1,i}),$$

where $A_{n,i}$ represents the skill level of resource n for skill i and $BR_{l,i}$ represents a skill weight for the work item for skill i, across all defined skills;

for each of the determined resources, determining a value RTV to the resource of servicing the work item, the value to the resource being a measure of how serving the work item by the resource helps or hurts goals of the individual resource, wherein $$RTV_n = \sum_{i=1}(T_{n,i} \times TW_{n,i}),$$

where $T_{n,i}$ represents a value of resource n for a resource treatment i, and $TW_{n,i}$ represents a weight of resource n for resource treatment i, across all resource treatments; and selecting a determined resource that has a best combined value of the business value and the value to the resource, to serve the work item.

31. The medium of claim 30 wherein:

determining a business value comprises determining the business value weighted by a business value weight corresponding to the work item;

determining a value to the resource comprises determining the value to the resource weighted by a resource value weight corresponding to the work item; and selecting comprises selecting a determined resource that has a best combined value of the weighted business value and the weighted value to the resource.

32. The medium of claim 31 wherein:

determining a business value comprises determining a weighted business value as a product of (a) the business value weight corresponding to the work item and (b) a sum of products of a level of each said needed skill of the resource and a weight of said needed skill of the work item; and determining a value to the resource comprises determining a weighted resource treatment value as a product of (c) a resource treatment weight corresponding to the work item and (d) a sum of products of each treatment of the resource and a weight of said treatment of the resource.

33. The medium of claim 32 wherein:

the sums of products are scaled sums, and the treatments are scaled treatments.

34. The medium of claim 33 wherein:

selecting comprises selecting the determined resource that has a highest sum of the weighted business value and the weighted resource treatment value.

35. The medium of claim 32 wherein:

the resource treatments of a resource comprise a time since the resource became available and a time that the resource has not spent serving work items.

36. The medium of claim 35 wherein:
the treatments of the resource further comprise a measure of an effect that serving of the work item would have on a goal of the resource.

37. The medium of claim 36 wherein:
the measure of the effect comprises a difference between (a) a distance of an actual allocation of worktime of the resource among skills from a goal allocation of the worktime of the resource among the skills and (b) a distance of an estimated allocation of the worktime of the resource among the skills if the resource serves the work item from the goal allocation.

38. A computer-readable medium containing instructions which, when executed in a computer, cause the computer to perform selection of a resource for a work item, comprising:
determining available resources that possess skills needed by the work item;
for each of the determined resources, determining a business value RSBV comprising a sum $$\sum$$

across all skills i of a product of a skill level $A_{n,i}$ of the resource n in the skill and a skill weight $BR_{1,i}$ of the work item for the skill, wherein $$RSBV_n = \sum_{i=1} (A_{n,i} x BR_{1,i});$$

for each of the determined resources, determining a resource treatment value RTV, the resource treatment value being a measure of how the resource is meeting goals of the individual resource, the resource treatment value comprising a sum $$\sum$$

across all of a plurality of resource treatments i of a product of a value $T_{n,i}$ of the resource n for the resource treatment and a weight $TW_{n,i}$ of the work item for how much weight said resource treatment has relative to others of the resource treatments, wherein $$RTV_n = \sum_{i=1} (T_{n,i} x TW_{n,i});$$

and
selecting a determined resource that has a best combined score of its business value and its resource treatment value, to serve the work item.

39. The medium of claim 38 wherein:
the resource treatments of a resource comprise a time since the resource became available, a time that the resource has spent not serving work items, and a measure of an effect that serving the work item would have on a goal of the resource.

40. The medium of claim 38 wherein:
determining a business value comprises
determining a scaled business value comprising the business value scaled by a first scaling factor that is common to all of the determined resources;
determining a resource treatment value comprises
for each resource treatment, determining a scaled value of the resource comprising the value of the resource for that resource treatment scaled by a scaling factor that is common for that resource treatment to all of the determined resources, and
determining a scaled resource treatment value comprising a sum, scaled by a second scaling factor that is common to all of the determined resources, across all resource treatments of a product of the scaled value of the resource for the resource treatment and a weight of the work item for the resource treatment; and
selecting comprises
selecting a determined resource that has a best sum of its scaled business value and its scaled resource treatment value to serve the work item.

41. The medium of claim 40 wherein:
each scaling factor comprises a fraction having in its denominator a maximum value of the value to which said scaling factor applies of any of the resources.

42. A computer-readable medium containing instructions which, when executed in a computer, cause the computer to perform selection of a work item for a resource, comprising:
determining available work items that need skills possessed by the resource;
for each of the determined work items, determining a business value WSBV of having the resource service the work item, the business value being a measure of qualification of the resource for servicing of the work item based on skills of the resource and skill requirements of the work item, wherein $$WSBV_n = \sum_{i=1} (A_{1,i} x BR_{n,i}),$$

where $A_{1,i}$ represents the skill level of the resource for skill i, and $BR_{n,i}$ represents a skill weight for the work item n for skill i, across all defined skills;
for each of the determined work items, determining a value WTV to the work item of being serviced by the resource, the value to the work item being a measure of how the work item is meeting goals of the individual work item, wherein $$WTV_n = \sum_{i=1} (C_{n,i} x CW_{n,i}),$$

where $C_{n,i}$ represents a value of a work item n for a work item treatment i, and $CW_{n,i}$ represents a weight of work item n for work item treatment i, across all work item treatments; and
selecting a determined work item that has a best combined value of the business value and the value to the work item to be served by the resource.

43. The medium of claim 42 wherein:
determining a business value comprises
determining the business value weighted by a business value weight corresponding to the work item;

determining a value to the work item comprises
determining the value to the work item weighted by a work item value weight corresponding to the work item; and
selecting comprises
selecting a determined work item that has a best combined value of the weighted business value and the weighted value to the work item.

44. The medium of claim 43 wherein:
determining a business value comprises
determining a weighted business value as a product of (a) the business value weight corresponding to the work item and (b) a sum of products of a level of each said needed skill of the resource and a weight of said needed skill of the work item; and
determining a value to the work item comprises
determining a weighted work item treatment value as a product of (c) a work item treatment weight corresponding to the work item and (d) a sum of products of each treatment of the work item and a weight of said treatment of the work item.

45. The medium of claim 44 wherein:
the sums of products are scaled sums, and
the treatments are scaled treatments.

46. The medium of claim 45 wherein:
selecting comprises
selecting the determined work item that has a highest sum of the weighted business value and the weighted work item treatment value.

47. A computer-readable medium containing instructions which, when executed in a computer, cause the computer to perform a selection of a work item for a resource, comprising:
determining available work items that need skills possessed by the resource;
for each of the determined work items, determining a business value WSBV comprising a sum $$\sum$$

across all skills i of a product of a skill level $A_{l,i}$ of the resource n in the skill and a skill weight $BR_{n,i}$ of the work item for the skill, wherein $$WSBV_n = \sum_{i=1} (A_{1,i} x BR_{n,i});$$

for each of the determined work items, determining a work item treatment value WTV, the work item treatment value being a measure of how the work item is meeting goals of the individual work item, the work item treatment value comprising a sum $$\sum$$

across all of a plurality of work item treatments i of a product of the value $C_{n,i}$ of the work item for the work item treatment and a weight $CW_{n,i}$ of the work item for how much weight said work item treatment has relative to others of the work item treatments, wherein $$WTV_n = \sum_{i=1} (C_{n,i} x CW_{n,i});$$

and
selecting a determined work item that has a best combined score of its business value and work item treatment value, to be served by the resource.

48. The medium of claim 47 wherein:
the work item treatments of a work item comprise a time that the work item has been waiting for service and an estimated time that the work item will have to wait for service.

49. The medium of claim 48 wherein:
the work item treatments of a work item further comprise a time by which the work item has exceeded its target wait time.

50. The medium of claim 48 wherein:
the estimated wait time that the work item will have to wait for service comprises a product of (a) a ratio of a total number of work items waiting for service and an average number of work items waiting for service and (b) a sum of average wait times of individual said needed skills each weighted by a ratio of the weight of said individual skill and a sum of the weights of the needed skills.

51. The medium of claim 47 wherein:
the work item treatments of a work item comprise a time that the work item has spent waiting to be serviced, an estimated time that the item will spend waiting to be serviced, and a time by which the work item has exceeded its target waiting time.

52. The medium of claim 47 wherein:
determining a business value comprises
determining a scaled business value comprising the business value scaled by a first scaling factor that is common to all of the determined work items;
determining a work item treatment value comprises
for each work item treatment, determining a scaled value of the work item comprising the value of the work item for that work item treatment scaled by a scaling factor that is common for that work item treatment to all of the determined work items, and
determining a scaled work item treatment value comprising a sum, scaled by a second scaling factor that is common to all of the determined work items, across all work item treatments of a product of the scaled value of the work item for the work item treatment and a weight of the work item for the work item treatment; and
selecting comprises
selecting a determined work item that has a best sum of its scaled business value and its scaled work item treatment value, to be served by the resource.

53. The medium of claim 52 wherein: each scaling factor comprises a fraction having in its denominator a maximum value of the value to which said scaling factor applies of any of the work items.

54. A method of selecting a work item for a resource, comprising:
determining by processor available work items that need skills possessed by the resource;
for each of the determined work items, determining by processor a weighted business value WSBV of having the resource n service the work item, as a product of (a)

the business value weight $W_{WSBV}$ or $WWSBV_n$ corresponding to the work item and (b) a sum $$\sum$$

of products of a level $A_{l,i}$ of each said needed skill i of the resource and a weight $BR_{n,i}$ of said needed skill of the work item, the business value being a measure of qualification of the resource for servicing of the work item based on skills of the resource and skill requirements of the work item, wherein $$WSBV_n = (W_{WSBV} \text{ or } WWSBV_n) \sum_{i=1} (A_{1,i} x BR_{n,i});$$

for each of the determined work items, determining by processor a weighted value WTV to the work item of being serviced by the resource, as a product of (c) a work item treatment weight $W_{CV}$ or $WWTV_n$ corresponding to the work item and (d) a sum $$\sum$$

of products of a value $C_{n,i}$ of each treatment i of the work item and a weight $CW_{n,i}$ of said treatment of the work item, wherein $$WTV_n = (W_{CV} \text{ or } WWTV_n) \sum_{i=1} (C_{n,i} x CW_{n,i}),$$

the value to the work item being a measure of how the work item is treated compared to other work items and treatment goals of the individual work item and comprising a time that the work item has been waiting for service, a time by which the work item has exceeded its target wait time, and an estimated time that the work item will have to wait for service comprising a product of (e) a ratio of a total number of work items waiting for service and an average number of work items waiting for service and (f) a sum of average wait times of individual said needed skills each weighted by a ratio of the weight of said individual skill and a sum of the weights of the needed skills; and selecting by processor a determined work item that has a best combined value of the weighted business value and the weighted value to the work item to be served by the resource.

55. A computer-readable medium containing instructions which, when executed in a computer, cause the computer to perform selection of a work item for a resource, comprising:

determining available work items that need skills possessed by the resource;

for each of the determined work items, determining a weighted business value WSBV of having the resource n service the work item, as a product of (a) the business value weight $W_{WSBV}$ or $WWSBV_n$ corresponding to the work item and (b) a sum $$\sum$$

of products of a level $A_{l,i}$ of each said needed skill i of the resource and a weight $BR_{n,i}$ of said needed skill of the work item, the business value being a measure of qualification of the resource for servicing of the work item based on skills of the resource and skill requirements of the work item, wherein $$WSBV_n = (W_{WSBV} \text{ or } WWSBV_n) \sum_{i=1} (A_{1,i} x BR_{n,i});$$

for each of the determined work items, determining a weighted value WTV to the work item of being serviced by the resource, as a product of (c) a work item treatment weight $W_{CV}$ or $WWTV_n$ corresponding to the work item and (d) a sum $$\sum$$

of products of a value $C_{n,i}$ of each treatment i of the work item and a weight $CW_{n,i}$ of said treatment of the work item, wherein $$WTV_n = (W_{CV} \text{ or } WWTV_n) \sum_{i=1} (C_{n,i} x CW_{n,i}),$$

the value to the work item being a measure of how the work item is treated compared to other work items and treatment goals of the individual work item and comprising a time that the work item has been waiting for service, a time by which the work item has exceeded its target wait time, and an estimated time that the work item will have to wait for service comprising a product of (e) a ratio of a total number of work items waiting for service and an average number of work items waiting for service and (f) a sum of average wait times of individual said needed skills each weighted by a ratio of the weight of said individual skill and a sum of the weights of the needed skills; and selecting a determined work item that has a best combined value of the weighted business value and the weighted value to the work item to be served by the resource.

* * * * *